US008572080B2

(12) United States Patent
Tobin et al.

(10) Patent No.: US 8,572,080 B2
(45) Date of Patent: Oct. 29, 2013

(54) METHODS AND SYSTEMS FOR ANALYZING A NETWORK FEED IN A MULTI-TENANT DATABASE SYSTEM ENVIRONMENT

(75) Inventors: Thomas J. Tobin, San Francisco, CA (US); Thomas D. Sola, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 0 days.

(21) Appl. No.: 13/154,324

(22) Filed: Jun. 6, 2011

(65) Prior Publication Data

US 2011/0302221 A1 Dec. 8, 2011

Related U.S. Application Data

(60) Provisional application No. 61/351,765, filed on Jun. 4, 2010.

(51) Int. Cl.
G06F 7/00 (2006.01)
G06F 17/30 (2006.01)

(52) U.S. Cl.
USPC .......................................... 707/736; 709/203

(58) Field of Classification Search
USPC ................... 709/203; 707/736, 805
See application file for complete search history.

(56) References Cited

U.S. PATENT DOCUMENTS

| 5,577,188 | A | 11/1996 | Zhu |
| 5,608,872 | A | 3/1997 | Schwartz et al. |
| 5,649,104 | A | 7/1997 | Carleton et al. |
| 5,715,450 | A | 2/1998 | Ambrose et al. |
| 5,761,419 | A | 6/1998 | Schwartz et al. |
| 5,819,038 | A | 10/1998 | Carleton et al. |
| 5,821,937 | A | 10/1998 | Tonelli et al. |
| 5,831,610 | A | 11/1998 | Tonelli et al. |
| 5,873,096 | A | 2/1999 | Lim et al. |
| 5,918,159 | A | 6/1999 | Fomukong et al. |
| 5,963,953 | A | 10/1999 | Cram et al. |
| 5,983,227 | A | 11/1999 | Nazem et al. |
| 6,092,083 | A | 7/2000 | Brodersen et al. |
| 6,169,534 | B1 | 1/2001 | Raffel et al. |
| 6,178,425 | B1 | 1/2001 | Brodersen et al. |
| 6,189,011 | B1 | 2/2001 | Lim et al. |
| 6,216,133 | B1 | 4/2001 | Masthoff |

(Continued)

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Ann Chempakaseril
(74) *Attorney, Agent, or Firm* — Weaver Austin Villeneuve & Sampson LLP

(57) ABSTRACT

The present disclosure discusses a dashboard application that compiles values across a set of records, each of the records having fields which include data pertaining to user-defined criteria. The user enters a query into the system, and the set of records is returned and analyzed according to the criteria. The results are numerical and are displayed in components of the dashboard. A user can customize the application and define components. Multiple users can view and subscribe to the dashboard and can select specific components to follow. Some components can have user-defined threshold values and can provide graphics displaying breakpoints of those values. When the system refreshes, or the user manually refreshes the dashboard, an alert is generated if the threshold value is traversed. The alert, including the component graphic, is posted in the subscriber's feed and a feed of the dashboard.

11 Claims, 13 Drawing Sheets

(56) References Cited

U.S. PATENT DOCUMENTS

| | | |
|---|---|---|
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,100,111 B2 | 8/2006 | McElfresh et al. |
| 7,269,590 B2 | 9/2007 | Hull et al. |
| 7,340,411 B2 | 3/2008 | Cook |
| 7,373,599 B2 | 5/2008 | McElfresh et al. |
| 7,401,094 B1 | 7/2008 | Kesler |
| 7,406,501 B2 | 7/2008 | Szeto et al. |
| 7,454,509 B2 | 11/2008 | Boulter et al. |
| 7,599,935 B2 | 10/2009 | La Rotonda et al. |
| 7,603,331 B2 | 10/2009 | Tuzhilin et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,827,208 B2 | 11/2010 | Bosworth et al. |
| 7,853,881 B1 | 12/2010 | Assal et al. |
| 7,945,653 B2 | 5/2011 | Zuckerberg et al. |
| 8,005,896 B2 | 8/2011 | Cheah |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,333 B2 | 6/2012 | Hubbard et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0004978 A1* | 1/2005 | Reed et al. .............. 709/203 |
| 2005/0050555 A1 | 3/2005 | Exley et al. |
| 2005/0091098 A1 | 4/2005 | Brodersen et al. |
| 2009/0063415 A1 | 3/2009 | Chatfield et al. |
| 2012/0290407 A1 | 11/2012 | Hubbard et al. |

* cited by examiner

| (.user) | 402 | 403 | 404 | (.user_data) | 402 | | | |
|---|---|---|---|---|---|---|---|---|
| Org_id | User_id | name | ..... | Val 0 | Val 1 | ..... | Org_id | User_id |
| ood 1<br>ood 1<br>ood 1<br>⋮ | U1<br>U2<br>U3<br>⋮ | | | Data_type1 | Data_type2 | | | |
| ood 2<br>ood 2<br>ood 2<br>⋮ | ⋮ | ⋮ | | | | | | |

*FIG. 4A*

User_Subscriptions

| User_id | Org_id | Obj_id | Obj_id | ..... |
|---|---|---|---|---|
| U987<br>U89<br>U3<br>⋮ | ood 1<br>ood 50<br>ood 65<br>⋮ | O32<br>O98<br>O341<br>⋮ | ⋮ | |

*FIG. 4B*

Dashboard_Table

| Dash_id | Dash_Name | Dash_Description | Comp_id_link | Created_by_id |
|---|---|---|---|---|
| D3<br>D301<br>D24<br>⋮ | Performance<br>⋮ | Accts, Support/Critical Cases<br>⋮ | C445,C32,C83<br>⋮ | U77<br>U31<br>U490<br>⋮ |

*FIG. 4C*

Component_Table

| Comp_id | Comp_Name | Comp_title | Dash_id | Report_id | Subscribers (Y/N) | Current Value |
|---|---|---|---|---|---|---|
| C445<br>C32<br>C83<br>⋮ | Critical Cases<br>Account Activity<br>Support Cases<br>⋮ | Most Popular People<br>Top Acct/Sales<br>Things to Come<br>⋮ | D3<br>D3<br>D3<br>⋮ | R1<br>R2<br>R3<br>⋮ | Y<br>Y<br>N<br>⋮ | U39, U7...<br>O19, O1..<br>500,000<br>⋮ |

*FIG. 4D*

Report_Table

| Report_id | Rep_Name | Obj_id | Obj_Fields | Calc_Type | Report_Value |
|---|---|---|---|---|---|
| R1<br>R2<br>R3<br>⋮ | CCReport<br>AAReport<br>SCReport<br>⋮ | O32,..<br>O98,..<br>O341,..<br>⋮ | F37,..<br>F808,..<br>F2,..<br>⋮ | Formula_1<br>Formula_7<br>Formula_2<br>⋮ | U8, U709..<br>O93, O4..<br>590,000<br>⋮ |

*FIG. 4E*

FIG. 12

METHODS AND SYSTEMS FOR ANALYZING A NETWORK FEED IN A MULTI-TENANT DATABASE SYSTEM ENVIRONMENT The present application claims benefit under 35 USC 119 (e) of U.S. provisional Application No. 61/351,765, filed on Jun. 4, 2010, entitled "METHODS AND SYSTEMS FOR ANALYZING A NETWORK FEED IN A MULTI-TENANT DATABASE SYSTEM ENVIRONMENT," the content of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application is related to the commonly owned, co-pending United States non-provisional patent application Ser. No. 12/945,410, entitled "SYSTEMS AND METHODS FOR IMPLEMENTING ENTERPRISE LEVEL SOCIAL AND BUSINESS INFORMATION NETWORKING," by Lee, filed Nov. 12, 2010 (Attorney Docket No. 021735-005910US), which is incorporated by reference herein in its entirety.

BACKGROUND

The present invention generally relates to analyzing communications, and more particularly to analyzing records for a network feed in an on-demand database and/or application service.

Running a company typically requires maintaining data related to the company's business, such as sales numbers, customers, business opportunities, and other information pertinent to sales, revenue, networking. This data is stored on a database that is accessible to various individuals belonging to that company. Often, it is more effective for the company to have a third party maintain a database containing the data, as opposed to the company maintaining the database itself. Accordingly, in some cases, the database can be a multi-tenant database, which maintains data for multiple companies.

Providing both social and business networking both within and between these companies offers an invaluable tool in the current technology based infrastructure. Not only can the networking facilitate communication between individuals, but it can also facilitate communications between groups of individuals, both within a single company and between several different companies. However, networking across such a large platform and maintaining knowledge of the shared information in that platform can be difficult. New data can be added to the system which provides important information to a user with whom that data is shared. However, the user can be unaware of that data without specifically accessing the location on the system where that data is stored. Additionally, users may wish to analyze like data in order to view specific aspects, e.g., goals, of a business or provide additional networking for those aspects.

Therefore it is desirable to provide systems and methods that overcome the above and other problems relating to facilitating the analysis of shared information to improve networking across a database system maintained on an external server, such as a multi-tenant database.

SUMMARY

Embodiments of the present invention provide systems, apparatus and methods for analyzing information shared between users of a database system. In particular, embodiments of the present invention provide a method of creating a collection of components, which are viewable by a user of the system. Each component includes an analysis of a selection of records associated with that particular component. The selection of records is based on user-defined criteria which is used to perform a query on the records in the database. The query produces a report, which produces a result including one or more numerical values for the component. In further embodiments, a user can define threshold values for certain component types. When the threshold values are traversed, the database system automatically generates an alert, which is realized in a story that is posted to a feed associated with the collection of components with which that component is associated.

In one embodiment and by way of example, a computer implemented method for analyzing records in a database system is provided. The method includes creating a collection of one or more components to be stored on the database system. The component is a visual metric representing one or more numerical values. The method further includes receiving a query including a criteria used to search a plurality of objects on the database system, providing a selection of records associated with the plurality of objects and associating the selection of records with at least one of said one or more components in the collection. In some embodiments, each of the records including one or more fields which satisfy the criteria. Accordingly, the method further includes analyzing the one or more fields of the selection of records based on the criteria to produce the one or more numerical values and displaying the collection of one or more components on a user interface. A computer program product comprising a computer tangible medium storing a plurality of instructions for controlling a processor to perform an operation for analyzing records in a database system described in the aforementioned method is also provided.

In another embodiment and by way of example, method for providing a story in a feed associated with a component on a database system is provided. The method includes receiving an indication of one or more threshold values for the component, compiling a report of aggregate values from one or more fields in a selection of records associated with one or more objects on the database system, validating the one or more threshold values against the report, generating the story when the one or more threshold values are traversed by the report values, and posting the story in the feed associated with component. In one embodiment, the component is a visual metric representing one or more numerical values. In another embodiment, the story is a description of an event occurring to the selection of records.

While the present invention is described with reference to an embodiment in which techniques for performing searches of feeds in an on-demand enterprise services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

Although the following figures depict various examples of the invention, the invention is not limited to the examples depicted in the figures.

FIG. 4A illustrates an exemplary table of an entity in a database system.

FIG. 4B illustrates an exemplary table of a subscription center in a database system.

FIG. 4C illustrates an exemplary table of dashboards in a database system.

FIG. 4D illustrates an exemplary table of components in a database system.

FIG. 4E illustrates an exemplary table of reports in a database system.

FIG. 12 illustrates an exemplary screenshot of comments on the story in the dashboard feed of FIG. 11.

DETAILED DESCRIPTION

Figure 1:
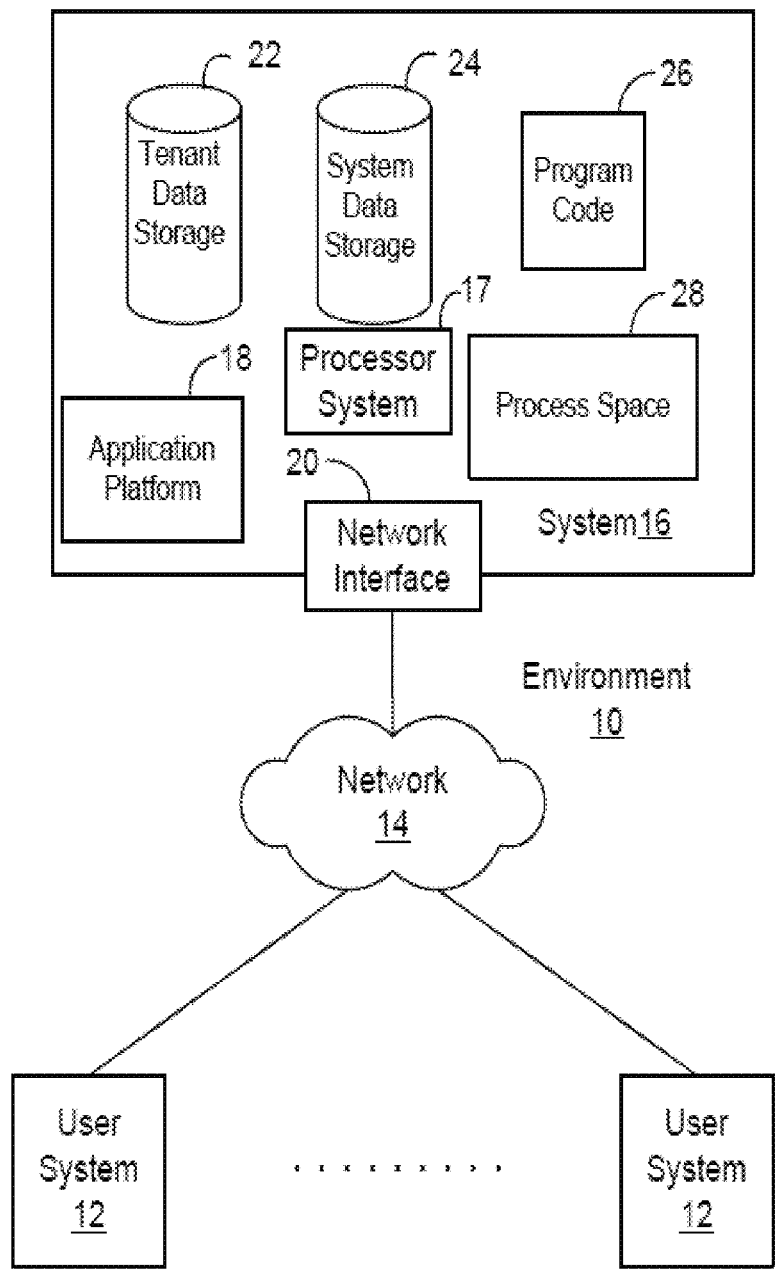
FIG. 1 illustrates a block diagram of an environment wherein an on-demand database service might be used.

The present invention provides systems and methods for analyzing communications data, and more particularly for analyzing data a network feed in an on-demand multi-tenant database and/or application service.

Embodiments of the invention discuss a dashboard application that compiles values across a set of records, each of the records having fields which include data pertaining to user-defined criteria. The user enters a query into the system and the aforementioned set of records containing fields satisfying the criteria is returned and analyzed according the criteria. The results of the analysis are numerical and are displayed in components of the dashboard, e.g., how many deals in a pipeline, sales per given account.

Each dashboard is an object having an associated record on the database system and each component is an object having associated records. The component is the graph, bar graph, pie chart, etc. that is displayed in the user interface (UI) of the dashboard application. A user can create the dashboard and define one or more components in that dashboard. Multiple users can view and subscribe to the dashboard and can select specific components to follow within a dashboard.

Some components in a dashboard can have user-defined threshold values and can provide graphics displaying breakpoints of those values. For example, the breakpoints could be sales surpassing 500,000 and 10,000,000 in a component analyzing sales across Account objects. When the system refreshes, or the user manually refreshes a dashboard, which that user is viewing, a story is created if the threshold value, e.g., breakpoint, is traversed by the current value aggregated across the fields satisfying the user-defined criteria. The story, including the component graphic, is posted in all feeds of the subscribers to the component and a feed of the dashboard object.

I. General Overview

Systems and methods are provided for analyzing a selection of records associated with a feed and for producing feed for enterprise level social and business information networking on a multi-tenant database system.

As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Enterprise level social and business information networking can allow for the multi-tenant database system users to subscribe to or "follow" other users in the system along with other "feeds" related to specific database entries. Following a user provides access to real-time updates about other users and the data entries (e.g., messages, updates, stories, etc.) added to followed feeds within the multi-tenant database system. A user can have multiple subscribers, and multiple subscribers can also belong to groups. Each group may be related to an object on the database, such as an Opportunity page of a tenant, and each user can be an object on the database. Records of the data added to each feed associated with an object can be stored as tables on the database. The records can include fields, which determine how the data is to be stored and displayed in a feed as well as maintain a list of the subscribers to that feed, along with any additional information and/or rules defined for that feed.

An example of the aforementioned type of enterprise level networking is referred to herein as Chatter®. Chatter® is a social networking service provided by salesforce.com, inc., that, in an embodiment, facilitates networking between users of tenants in a multi-tenant database.

An overview of a multi-tenant database system in which Chatter® can be implemented will be described in the following sections. The following sections then describe a user-defined collection of records in the database, which are utilized to display a value for those records to the user. The final section provides mechanisms and methods for implementing Chatter® (e.g., feed) communication dependent on values returned for the aforementioned user-defined collection of records. The following description of analyzing aspects of Chatter® and the database system is made with reference to example embodiments.

II. System Overview

FIG. 1 illustrates a block diagram of an environment 10 wherein an on-demand database service might be used. Environment 10 may include user systems 12, network 14, system 16, processor system 17, application platform 18, network interface 20, tenant data storage 22, system data storage 24, program code 26, and process space 28. In other embodiments, environment 10 may not have all of the components listed and/or may have other elements instead of, or in addition to, those listed above.

Environment 10 is an environment in which an on-demand database service exists. User system 12 may be any machine or system that is used by a user to access a database user system. For example, any of user systems 12 can be a handheld computing device, a mobile phone, a laptop computer, a work station, and/or a network of computing devices. As illustrated in FIG. 1 (and in more detail in FIG. 2) user systems 12 might interact via a network 14 with an on-demand database service, which is system 16.

An on-demand database service, such as system 16, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 16" and "system 16" will be used interchangeably herein. A database image may include one or more database objects. A relational database management system (RDMS) or the equivalent may execute storage and retrieval of information against the database object(s). Application platform 18 may be a framework that allows the applications of system 16 to run, such as the hardware and/or software, e.g., the operating system. In an embodiment, on-demand database service 16 may include an application platform 18 that enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities and the capacity of a particular user system 12 might be entirely determined by permissions (permission levels) for the current user. For example, where a salesperson is using a particular user system 12 to interact with system 16, the user system 12 has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global inter-network of networks often referred to as the "Internet" with a capital "I," that network will be used in many of the examples herein. However, it should be understood that the networks that the present invention might use are not so limited, although TCP/IP is a frequently implemented protocol.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP messages to and from an HTTP server at system 16. Such an HTTP server might be implemented as the sole network interface between system 16 and network 14, but other techniques might be used as well or instead. In some implementations, the interface between system 16 and network 14 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 16, shown in FIG. 1, implements a web-based customer relationship management (CRM) system. For example, in one embodiment, system 16 includes application servers configured to implement and execute CRM software applications as well as provide related data, code, forms, webpages and other information to and from user systems 12 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared, such as will be described in the case of feeds (i.e., a feature of "Chatter®"). In certain embodiments, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

One arrangement for elements of system 16 is shown in FIG. 1, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 1 include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 16 or other systems or servers. For example, the user interface device can be used to access data and applications hosted by system 16, and to perform searches on stored data, and otherwise allow a user to interact with various GUI pages that may be presented to a user. As discussed above, embodiments are suitable for use with the Internet, which refers to a specific global inter-network of networks. However, it should be understood that other networks can be used instead of the Internet, such as an intranet, an extranet, a virtual private network (VPN), a non-TCP/IP based network, any LAN or WAN or the like.

According to one embodiment, each user system 12 and all of its components are operator configurable using applications, such as a browser, including computer code run using a central processing unit such as an Intel Pentium® processor or the like. Similarly, system 16 (and additional instances of an MTS, where more than one is present) and all of their components might be operator configurable using application (s) including computer code to run using a central processing unit such as processor system 17, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 16 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 16 is configured to provide webpages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 2:
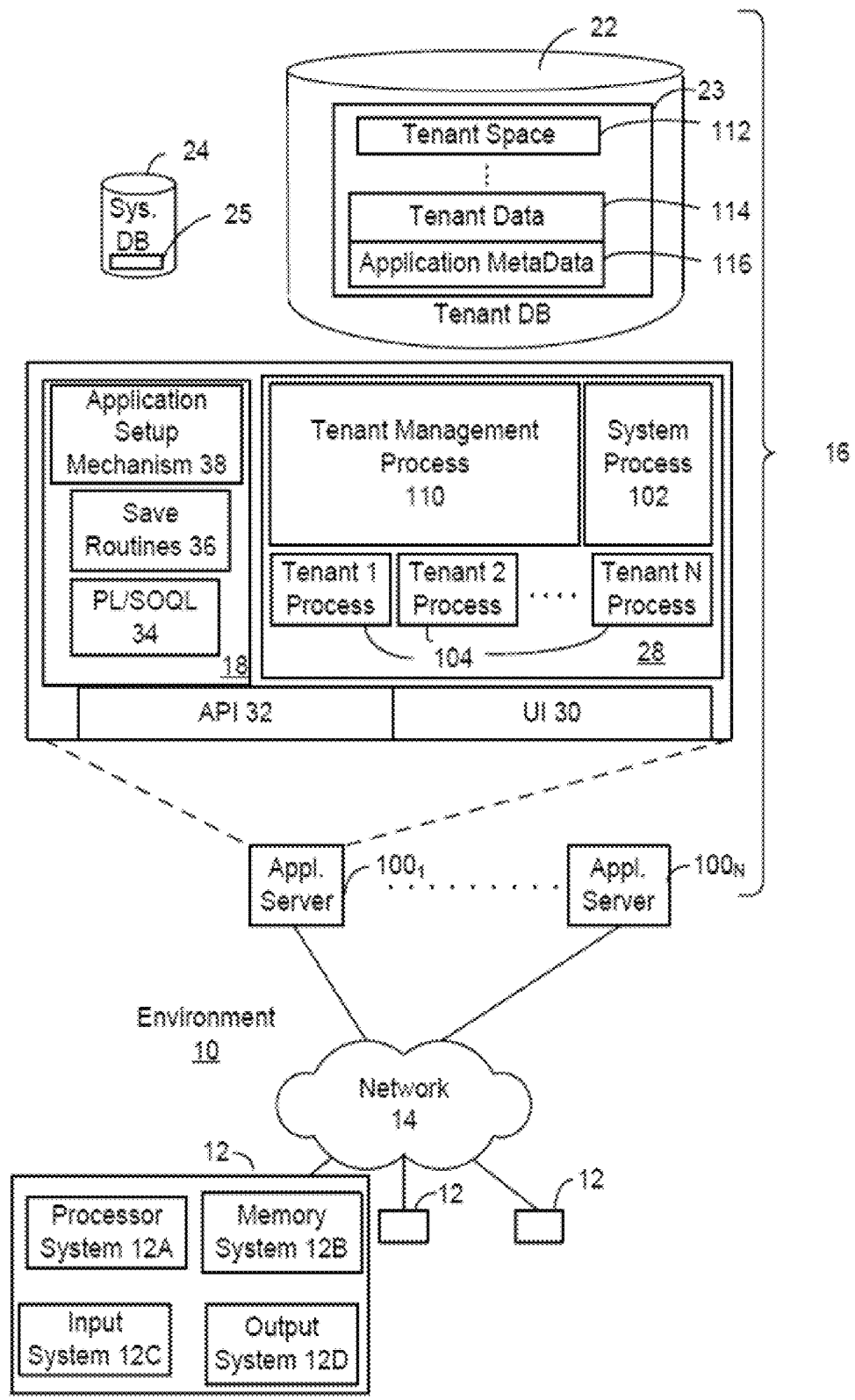
FIG. 2 illustrates a block diagram of an embodiment of elements of FIG. 1 and various possible interconnections between these elements according to an embodiment of the present invention.

FIG. 2 also illustrates environment 10. However, in FIG. 2 elements of system 16 and various interconnections in an embodiment are further illustrated. FIG. 2 shows that user system 12 may include processor system 12A, memory system 12B, input system 12C, and output system 12D. FIG. 2 shows network 14 and system 16. FIG. 2 also shows that system 16 may include tenant data storage 22, tenant data 23, system data storage 24, system data 25, User Interface (UI) 30, Application Program Interface (API) 32, PL/SOQL 34, save routines 36, application setup mechanism 38, applications servers $100_1$-$100_N$, system process space 102, tenant process spaces 104, tenant management process space 110, tenant storage area 112, user storage 114, and application metadata 116. In other embodiments, environment 10 may not have the same elements as those listed above and/or may have other elements instead of, or in addition to, those listed above.

User system 12, network 14, system 16, tenant data storage 22, and system data storage 24 were discussed above in FIG. 1. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 2, system 16 may include a network interface 20 (of FIG. 1) implemented as a set of HTTP application servers 100, an application platform 18, tenant data storage 22, and system data storage 24. Also shown is system process space 102, including individual tenant process spaces 104 and a tenant management process space 110. Each application server 100 may be configured to tenant data storage 22 and the tenant data 23 therein, and system data storage 24 and the system data 25 therein to serve requests of user systems 12. The tenant data 23 might be divided into individual tenant storage areas 112, which can be either a physical arrangement and/or a logical arrangement of data. Within each tenant storage area 112, user storage 114 and application metadata 116 might be similarly allocated for each user. For example, a copy of a user's most recently used (MRU) items might be stored to user storage 114. Similarly, a copy of MRU items for an entire organization that is a tenant might be stored to tenant storage area 112. A UI 30 provides a user interface and an API 32 provides an application programmer interface to system 16 resident processes to users and/or developers at user systems 12. The tenant data and the system data may be stored in various databases, such as one or more Oracle™ databases.

Application platform 18 includes an application setup mechanism 38 that supports application developers' creation and management of applications, which may be saved as metadata into tenant data storage 22 by save routines 36 for execution by subscribers as one or more tenant process spaces 104 managed by tenant management process 110 for example. Invocations to such applications may be coded using PL/SOQL 34 that provides a programming language style interface extension to API 32. A detailed description of some PL/SOQL language embodiments is discussed in commonly owned co-pending U.S. Pat. No. 7,730,478 entitled, "METHOD AND SYSTEM FOR ALLOWING ACCESS TO DEVELOPED APPLICATIONS VIA A MULTI-TENANT ON-DEMAND DATABASE SERVICE," by Craig Weissman, filed Sep. 21, 2007, which is incorporated in its entirety herein for all purposes. Invocations to applications may be detected by one or more system processes, which manage retrieving application metadata 116 for the subscriber making the invocation and executing the metadata as an application in a virtual machine.

Each application server 100 may be communicably coupled to database systems, e.g., having access to system data 25 and tenant data 23, via a different network connection. For example, one application server $100_1$ might be coupled via the network 14 (e.g., the Internet), another application server $100_{N-1}$ might be coupled via a direct network link, and another application server $100_N$ might be coupled by yet a different network connection. Transfer Control Protocol and Internet Protocol (TCP/IP) are typical protocols for communicating between application servers 100 and the database system. However, it will be apparent to one skilled in the art that other transport protocols may be used to optimize the system depending on the network interconnect used.

In certain embodiments, each application server 100 is configured to handle requests for any user associated with any organization that is a tenant. Because it is desirable to be able to add and remove application servers from the server pool at any time for any reason, there is preferably no server affinity for a user and/or organization to a specific application server 100. In one embodiment, therefore, an interface system implementing a load balancing function (e.g., an F5 Big-IP load balancer) is communicably coupled between the application servers 100 and the user systems 12 to distribute requests to the application servers 100. In one embodiment, the load balancer uses a least connections algorithm to route user requests to the application servers 100. Other examples of load balancing algorithms, such as round robin and observed response time, also can be used. For example, in certain embodiments, three consecutive requests from the same user could hit three different application servers 100, and three requests from different users could hit the same application server 100. In this manner, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain embodiments, user systems 12 (which may be client systems) communicate with application servers 100 to request and update system-level and tenant-level data from system 16 that may require sending one or more queries to tenant data storage 22 and/or system data storage 24. System 16 (e.g., an application server 100 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, filed Apr. 2, 2004, entitled "CUSTOM ENTITIES AND FIELDS IN A MULTI-TENANT DATABASE SYSTEM", and which is hereby incorporated herein by reference, teaches systems and methods for creating custom objects as well as customizing standard objects in a multi-tenant database system. For example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Theses customers, or tenants, may also be able to share these entities or objects or selective information relating to those entities with other customers subscribing to the database as well as between users having access to that customer's entities. The aforementioned shared information, which also can be referred to as Chatter® by salesforce.com, inc., facilitates social and business networking between users of the tenants in the multi-tenant database. If a customer provides public access rights to view a particular entity (i.e., object), any number of users can subscribe to that entity. Accordingly, if any form of Chatter® (e.g., data in a feed) is added to a feed of that entity, modifications and/or additions are made to the information stored in the record (e.g., a table) for that entity, and a story, message, post or other data shared in the feed is made viewable to the subscriber(s).

The following detailed description will explain the analysis of aforementioned shared information across a database. The detailed description will first provide an overview of Chatter® and the definitions of the terms for elements relating to networking which implements Chatter®. The following sections then describe methods of creating a collection of records associated with one or more object in accordance with aspects and embodiments. The creation of the collection of records can include components, each of which provide an analysis of a selection of those records. The collection of records, the components and how the analysis on a selection of records, is described. Further, exemplary embodiments of how the analyzed records can be networked through Chatter® is described.

III. Chatter®

Chatter® is a term used to describe social and business networking between users of tenants in a multi-tenant database. This networking can be implemented by tracking updates made on the database, such as modifications of data in a record (e.g., stories), or data posted to a feed (e.g., comments, posts, messages) by a user. Chatter® is further described in commonly owned U.S. patent application Ser. No. 12/945,410, filed Nov. 12, 2010, entitled "Enterprise Level Business Information Networking for Changes in a Database," which is incorporated by reference.

Feeds are a stream of news stories about what other users are doing in the database system. In one aspect, they are a way to stay up-to-date as well as an opportunity to reach out to your co-workers/partners and engage them around common goals. Feeds can include stories, messages, comments and posts, which are added by other users whom subscribe to that entity, or object on the database system.

Stories describe events that happen to a record (including a user record). In one embodiment, the stories are conveyed in complete sentences, and thus can be easily understood as they are in "plain English." In various embodiments, stories can be generic containers with formatting restrictions, can be published to multiple feeds, can be deleted by the author (which deletes story from all feeds), can include multiple change events in one story (john changed the account status and amount . . . ), and respects sharing and field-level security (FLS).

Feeds include Stories and can show up across an application associated with the database. Feeds can be scoped to the context of the page on which they are being displayed. For example, how a story is presented can vary depending on which page it is being displayed (e.g. in news feeds, discussed below). In one embodiment, a feed can contain a finite number of stories (e.g. 50).

Events are activities in the system that trigger a story. For example, an event can be whenever data is saved to a record or to one of its related records, or the creation/deletion of a record. The events that trigger a story for a record can be restricted to changes for only certain fields of the record, which can differ depending on which user is receiving the feed. Likewise, in an embodiment, a record can include a field indicating that specific events in the Events History Table are private, which automatically encrypts stories triggered by those events. Encryption of messages is further described below and this type of selective encryption of private data marked private can be similarly applied to records of objects (i.e., entities).

Entity Feeds are feeds on an entity record (like Account, Opportunity, Case, Contact). For example, an entity feed can tell a user about the actions that people have taken on that particular record or on one its related records. The entity feed can include who made the action, which field was changed, and the old and new values. In one embodiment, a user can access an entity feed by viewing the record, and the feed can be displayed on a home page (detail page) of the entity. Stories of an entity feed can also be posted (published) via a news feed. In one embodiment, Entity Feeds can exist on all supported object detail records as a related list.

Profile Feeds exists for user profiles and can tell a first user about all the actions that a person (whose profile feed is being viewed) has taken across all the objects that are visible to the first user. A profile feed can be provided on a user's profile page. In one embodiment, a profile feed can be considered a special type of entity feed on the user record. For example, if a user record stores activities of the user, the profile feed can provide stories about these updates to the user record. In one embodiment, Profile Feeds contain stories about the last fifty ("50") actions (or some other amount) this user took that created an event. A Profile Feed can also include shared information from one user to the person whose profile feed is being viewed in the form of a post, comment or message, all which are explained in further detail in the following paragraphs. In another embodiment, a Profile Feed can include the last fifty ("50") data entries to the feed, such as stories, comments, messages and posts.

A News Feed is an aggregated feed of all the entity feeds to which a user subscribes. The news feed, which may also be referred to generally as a feed, can be provided on the home page of the subscribing user. Thus, a news feed can be created by and exist for a particular user. For example, a user can subscribe to receive entity feeds of certain records that are of interest to the user, and to receive profile feeds of people that are of interest (e.g. people on a same team, that work for the user, are a boss of the user, etc.). A news feed can tell a user about all the actions across all the records (and people) you've explicitly (or implicitly) subscribed to via the Subscriptions Center (described below). In one embodiment, only one ("1") instance of each story is shown on a user's news feed, even if the story is published in multiple entities to which the users is subscribed. In one aspect, there may be delays in publishing news articles. For example, the delay may be due to queued up messages for asynchronous entity history persistence. Different feeds may have different delays (e.g. delay for new feeds, but none of profile and entity feeds). In another embodiment, certain stories regarding a subscribed profile feed or an entity feed are not shown because the user is not allowed, e.g. due to sharing rules (which restrict which users can see which data).

In one embodiment, a group feed can be setup, where a group of users receive the same data posted to the feed. In various embodiments, the group can be created based on certain criteria that are common to the users, can be created by inviting users, or can be created receiving requests to join from a user.

Also, in some embodiments, the record that has been updated, which includes creation of the record, can be provided in the feed (e.g. as a flash rendition of the document) to show which users are part of the group. This can be accomplished by altering the settings of the group feed. For instance, when a field changes in the record, or a new field is added, a column (or row), which includes the users of group in the record of the group feed, is copied into the feed.

In one embodiment, sharing rules and FLS are applied when the feed is being displayed. In another embodiment, profile feeds can be updated immediately after action is taken, such as when a message or comment is posted to the feed.

In some embodiments, a Subscription Center acts as a centralized place in the application associated with the database (e.g. application platform 18) to manage which records a user subscribes to, and which field updates the user wants to see on those stories. The Subscription Center can use a subscription table to keep track of the subscriptions of various users. In one embodiment, the subscription center shows a list of all the items to which a user is subscribed. A user can unsubscribe to subscribed objects from the subscription center. In an embodiment, when stories are created dynamically, access rule checks are not done upon subscription or unsubscription. In another embodiment, access rule checks are done upon subscription or unsubscription. For instance, the privacy rules of an object are imposed upon subscription to an object and keys are automatically generated and stored between the object and the subscriber upon subscription. The sharing of keys for access to shared information in a feed is detailed further in the section labeled "Securing Feed Data."

In one embodiment, a user may be required to have read access on an entity to create a subscription to it. For example, a user cannot subscribe to a private object to which public access is not available. This can minimize (but not eliminate) the case where a user is subscribed to entities they cannot access which slows down news feed queries.

In one embodiment, there is an Auto Subscription feature. This automatic subscription can ensure that a user is receiving certain feeds. Auto subscription can happen upon: 1.) New entity creation: the owner (not necessarily the user who created the entity) is subscribed; 2.) Ownership change: the new owner should become auto subscribed; and 3.) Lead convert: the user doing lead convert should be auto subscribed to the new account, opportunity and contact. Auto subscription can be controlled by per user preference. The user-preference can be a negative preference so that the default is to auto-subscribe.

Comments can be added to (hang off) any story and a user can reply to other comments on the same story. In one embodiment, story comments don't trigger other stories. In another embodiment, comments stay with the story, so if a comment is made in the News Feed, it propagates to the appropriate Entity Feed as well. If a story is deleted, its corresponding comments are deleted as well. Comments can also be filtered. For example, a tab can exist to see all comments made by the user and its corresponding stories. In yet another embodiment, new comments don't update the story timestamp. Also, the story can be continued to show if it has had a comment within the last week.

In some embodiments, most stories can be commented on. In other embodiments, Ideas Stories, Collaboration Stories, and Case Stories are not commentable. In one embodiment, if a user in whose profile feed the story is located or the user who causes the generation of the story to occur marks the story as "private", the story cannot be commented on. In a further embodiment, if the story is marked private prior to generation, the story may not appear in any feed. In further embodiments, only a user who has access to a story, i.e., caused the generation of the story, can comment on the story.

Wall Posts are comments on a profile page or an entity page, as opposed to a comment on a specific story. Wall posts are another form of a story, which is not triggered by a change to the record in the system, but an addition to the record on a profile page or entity page made by a user having access to those pages. In one embodiment, the Wall posts can last forever. In some embodiments, wall posts can be appended to other wall posts, similar to comments on stories, as described above. As will be described in further detail in the following sections, these wall posts, which may also be referred to as messages, feed data or, generally, as posts, can be selectively visible to users on the database system. The user entering the message into a feed can pre-select the sharing rules for messages originating from that user, such as in other's profile pages, entity pages or to groups. Alternatively, the user can select which other users or groups of users will have access to view the message once it is entered. In some embodiments, the user whose profile feed into which the message is posted can also impose sharing rules on the message.

Status Posts are short, SMS-sized messages (e.g., up to 1000 characters, according to an embodiment) posted by users that can answer a specific question, which can be posted as a comment or wall post. In one embodiment, status posts also can last forever. In an embodiment, users can rate the different status posts so that a best answer can be identified.

In some embodiments, stories, comments, and posts can be provided on feeds associated with users of different tenants or within the originating tenant, as well as objects in different tenants or within the originating tenant. Sharing rules can ensure that users do not see data within a feed that they are not permitted to see as selected by the user adding that data to a feed or administrator of an object which accepts feed data from a plurality of users on the multi-tenant database system. For instance, if a tenant allows a particular object (e.g., user profile, opportunity, etc.) to be "public", other tenants may readily view the data posted in the feed associated with that object. Alternatively, only feed data associated with specific fields of that object may be viewable, or only data (e.g., posts, messages, comments) left "public" by the subscribers to the object feed may be viewable by all the subscribers or users having viewing access to that feed. In some embodiments, only the subscribers to that object feed may view the data in the feed. These sharing rules, along with how the shared data is protected both between users and tenants, are further explained in the following sections.

A Feed Generator can generate the top stories (e.g. 50) and story comments that show up on Entities, Profiles and news Feeds. The feed generator can de-dupe events (i.e. prevent duplicates) that are generated from numerous objects. For example, since a story can be published to multiple feeds (e.g. John Choe changed the Starbucks Account Status) and a person can be subscribed to both the Starbucks account and John Choe, embodiments can filter out duplicates before displaying the items in a news feed. Thus, the Feed Generator can collapse events with multiple records for a single transaction into a single story and ensures the right number of stories for the particular feed.

In one embodiment, feeds are generated by the feed generator by querying the appropriate subset of: The Feeds Entity History, Status posts, Wall posts and associated story comments. What gets recorded in the Entity history table, as well as what is displayed, is controlled by the Feed Settings page in setup, which is configurable by an administrator and is the same for the entire organization. The Feed Generator can also check to make sure that no one sees data that they don't have access to see (e.g. according to sharing rules queried in the Feed Entity table). In one embodiment, in the news feed, the Feed Generator looks at a person's subscription center to decide which feeds to query and returns a de-duped list of stories for the user.

There can be various feed settings for the generation of different feeds. For profile feeds and entity feeds, stories can be written for all standard and custom fields on the supported objects. Feed settings can limit how many and which fields are be tracked per object. In one embodiment, there is a separate limit for number (e.g. 20) of trackable fields for entity history changes shown in the feed. A separate UI can exist to capture those changes. In another embodiment, default values may be picked for the field preferences table and eventually expose it in a "Subscriptions Center."

In some embodiments, feed queries only return changes in records, e.g., stories, for entities for which the user has access. In one aspect, an individual field change may not be visible if the user does not have FLS access to the field of a particular object.

Regarding viewing privileges of feed, in one embodiment, a user can always see all of his own subscriptions, even if that user has lost read access to the parent record. For access to other user's and entity's subscriptions, a user may require read-access on the parent-id to see the subscription. Having visible access to the subscriptions can be determined in the initial set-up of the feed associated with a user and/or entity and can be given to a user by an administrator of a tenant in the database system.

Regarding create and delete privileges, in one embodiment, users with having the ability to modify all data, e.g., administrator rights, can create and delete any subscriptions to an object. For example, if a user is an administrator of an entity, or has all access rights to that entity, the user may be able to delete one or more subscribers in the plurality of users subscribing to that entity. However, other users in the plurality of users subscribing to that entity may only be able to discontinue their own subscription to that entity. In another embodiment, a user can create and delete subscriptions only for his/herself.

Once a subscription to an entity or other user is discontinued (e.g., deleted), sharing rules for viewable access to data within the entity's feed are also discontinued, or imposed, dependent on how the rules are defined for that particular feed. However, any sharing rules defined by the user whose subscription to the feed has been deleted, are automatically discontinued as well. For feeds having public access rights, a user is not required to subscribe to the feed in order to see all the content associated with the feed.

Supported Events include actions for standard fields, custom fields, and standard related lists. Regarding standard fields, for the entity feed and the profile feed, a standard field update can trigger a story to be published to that feed. In one embodiment, which standard field can create a story visible in the entity feed can be set by an administrator of the entity. In another embodiment, a user can set which standard fields create a story for that user's feed if they are subscribing to that entity and associated fields, and if the administrator has granted public access rights to those fields. A user can also set a custom field to create a story for that user's feed and for a feed associated with a record including that field. The user defined criteria for creating these types of stories is further explained in section III. Custom fields can be treated the same or differently than standard fields. User's profile feeds can be treated as custom objects having custom fields defined by the user, or defined by the administrator of the tenant so that specific events triggering stories within a feed can be made visible to only a limited amount of users.

If a user wants to see a feed of the related list item, then the user can subscribe to it. For example, a user may find a specific opportunity related to a specific account to be of interest. Thus, if a user cares about that object, they can always browse to that object's feed, or subscribe to that object in their news feed. In some embodiments, depending on the sharing rules imposed by the owner of an object, the feed of the related list item may or may not be viewable by the user subscribing to that item and/or the feed of the parent object may not be viewable to the user. In one embodiment, all related Objects are tracked separately from the entity history table and each object can include a field identifying whether or not the feed of that object is viewable to a user.

The following section provides further detail on how records are analyzed and how the results are shared by users in the database system.

IV. Dashboard

Methods and systems for analyzing a selection of records to produce a customized graphical display to a user on the database system. These methods and systems are described with reference to FIGS. 3-7.

A Dashboard is a composite of a set of analytical indicators made up of aggregate values, e.g., values composed of sums and averages, across a set of records associated with objects in a given entity of the database system. The dashboard is a collection of one or more components.

Components are graphical metrics defined by a user of the database who created the dashboard with which the components are associated. A graphical metric can include, for example, a table, graph, plot, gauge, chart, or any other display of statistical data. Each of the components in a dashboard is utilized to display one or more numerical values produced by an aggregation of data across one or more fields in a selection of records. The user who defines the criteria for the component, e.g., the creator of the component, indicates the selection of records in the database system which are to be analyzed in the graphical metric. For example, a component could be the current number of deals in a pipeline of plurality of accounts with which an entity is associated. According to certain embodiments, network feeds, including chatter, e.g., CRM chatter, are analyzed.

A user can associate any number of components with one dashboard. However, in some embodiments, the number of components permitted in one dashboard is limited to a specified number, e.g., 20. A dashboard can include as few as one component.

Figure 3:
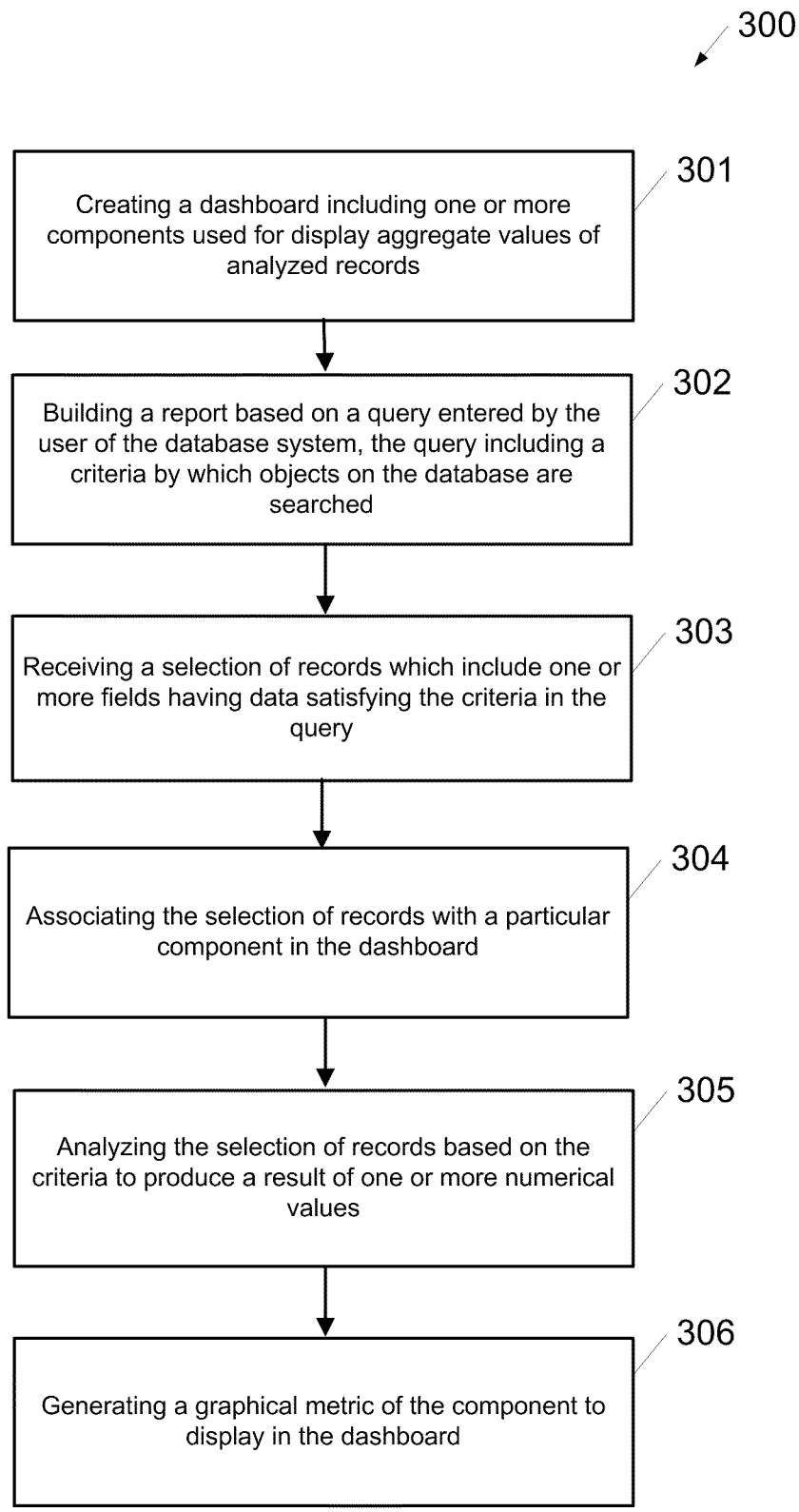
FIG. 3 illustrates a flowchart of a method for creating a dashboard in a database system.

Referring now to FIG. 3, a method 300 is provided for creating a dashboard including at least one component. In such an embodiment, any user on the database system can create a dashboard of components related to object records to which that user has visibility, e.g., access rights to view. The user can create, name and build the dashboard by adding any number of components. In some embodiments, a single dashboard is limited to a specific number of components, e.g., 20. However, a user can create any number of dashboards to accommodate more components.

As described in previous sections, a multi-tenant database is comprised of a number of entities, which are objects on the database system. The Entities can have a plurality of related child objects, which define that entity. For example, an entity can be an Account and a related object can be a feed for that Account. Both the entity object and the feed object have records associated with them in order to store both data defining those objects and fields including values, which are referenced to provide data relating to that entity object.

As shown in FIG. 4A, an Entity table of table of user profiles is provided. Each user is part of an tenant, e.g., organization 'org #1, org#2, etc.', on the database. Accordingly, a field in the user profile table defines with which tenant a user is associated. The user can also have an individual user identifier, e.g., 'user_id,' to define that user within that tenancy. The user_id can be utilized in related tables (records) as a reference to the user information, e.g., name, title, etc. which is provided in further detail within a user data table that references the user_id and Org_id. Each data field relating to the user can have an associated value, which is defined by a column in the user data table.

Each user on the database system can subscribe to a particular object on the system, in order to view, e.g. a related feed and/or other related records of that object. Accordingly, as section II relating to Chatter® describes, a Subscription center is provided which provides a record of all of the objects to which a user is associated. An exemplary table of a subscription center is illustrated in FIG. 4B. In the subscription table 404, a user is identified by the user_id 402 and the Org_id, 401 as multiple users can potentially have the same user_id, e.g, U3, but reside in a different tenant, e.g., Org_1, Org_2, etc. The subscription table 404 can further include any number of columns 403 identifying an object to which the user subscribes. The records for those objects can further identify specific fields and/or other related records of that object to which a user subscribes. Thus, each identifier within a table can be utilized to reference another related record (table). As previously described, a dashboard can be an object (e.g., 403 Obj_id) having both related records to that object and related child objects, each having a number of related records. The user can subscribe to the dashboard object, which can be referenced by the dashboard identifier dash_id (shown in FIG. 4C) in the user subscription table 404, e.g., Obj_id 403 can equal D3 (shown in FIG. 4C) for user U987 in organization ood 1.

The creation of a dashboard and related components as objects and records in a database system is further described below with particular reference to FIGS. 4C-4E.

In step 301, a user creates a dashboard for a collection of components. The user can select a tab, which can be located in the user interface (UI), indicating the dashboard application. Within the application, the user can be presented with a listing of the current dashboards to which they subscribe and/or have access rights to view. Additionally, the user can be presented with an interface to create a new dashboard, by requesting the creation, e.g., through selection of a button, and providing identifying features of the dashboard to be stored in a record associated with an object created for that dashboard, e.g., Dashboard Table 408 in FIG. 4C. Each time a dashboard is created by a user, the dashboard can be assigned a dashboard identifier, Dash_id 404, by the system and can be assigned a row to occupy in the Dashboard table 408. Additionally, fields within the dashboard table can be created to include identifying features such as a name, e.g., Dash_name 405, and a short description of the contents, e.g., Dash Description 406, each of which store textual data. The table can additionally include a field, e.g., Created_by_id, indicating which user on the system created a particular dashboard. Any number of fields, 404, 405, 406, 407, are capable of being within the dashboard table 408 and the fields are not limited to the fields previously described.

Once the dashboard has been created, a user can begin to add customized components 407 to the dashboard. A link to each of the components within a dashboard is provided within a Comp_id_link field 407 in the dashboard table 408. The links point the system to a component table 415 in FIG. 4D, which defines each component of a particular dashboard in a record. In some embodiments, a dashboard includes one or more default components, in which the user's profile entity fields are utilized as the fields in the records across which values are aggregate to display in each component. For example, a default dashboard could include the user's updates by day in a week time frame. In other embodiments, the user defines each component that is in the collection of components comprising the dashboard.

Referring again to FIG. 4D, a component table includes a system assigned component identifier, 'Comp_id' 409, which is utilized as a reference in the field of the dashboard table to call upon values and associated with that component when a dashboard is generated in the user interface. The component table also includes a name field, e.g., 'Comp_Name' 410, for the name of the component, and a short description of the component, e.g., 'Comp_title' 411, each of which can be provided by a user at the time of creation of the component. The component table 415 also includes a dash_id field 404 providing a reference to the dashboard with which a component is associated, a report_id field 412 providing reference to a report producing the values for the visual graphic of the component, and a current value field 414 indicating the last value produced by the report for that component.

An additional subscriber field 413 can also be provided within the component object record 415, which provides a value indicating if a particular component is being subscribed to by one or more users of the database system. This indication allows the system to determine if any other function is to be performed on the component. Such functions are further described within reference to FIGS. 8-12 in section IV.

Referring back to FIG. 3, in step 302, a user enters a query to the system in order to define the features, which are displayed in a given component. For example, a user can enter a query of "accounts by region," which search Account objects across the database for fields relating to "region" or "location." The query results provide a selection of records, which satisfy the criteria of the query, e.g., fields including a "region." As illustrated in FIG. 4D, the results are utilized to build a report, which further includes the calculations 418 which the user has defined to be utilized on that set of values returned in the results. Accordingly, a report is a query defining a component. The component is a visual representation of the report results. The results, e.g., 'report_value' 419 are numerical, regardless of whether the object field 407 associated with the report is a characteristic of an object, e.g., updates to a user profile feed over a set time period, or a numerical value itself. The calculations 418 can include, for example, a summation, a subtraction and product or a function of the data within the fields 407 of the selection of records associated with each component.

Next, in step 303, the system searches the database for the criteria entered by a user and determines the field (field_id) and object (obj_id) identifiers in which that criteria is located. These identifiers are included in the report. The report also includes an indication of the objects, which are associated with a particular component. The system returns the records when a query is entered into the system by the user. Accordingly, as shown in FIG. 4D, the entities can be identified in a field 'Obj_id' 403 of the report record 420, e.g., Report_table, and the fields of those entities which are referenced, e.g., from which the aggregated data is taken, can also be identified in a field 'Obj_fields' 407 of the report. Each report stored within a Report object 420, e.g., a table defining each report based on fields in a selection of records, can include an identifier, e.g., 'Report_id' 412, which is referenced by the component table 415 in FIG. 4D with which it is associated.

In step 304, the database system associates the selection of records analyzed in the report with the component in which the report is referenced and with the particular dashboard that references that component. For example, as shown in FIG. 4D, a report_id, e.g., R1, R2, etc., relating to the query performed by the system is stored within the component table 415. In some embodiments, the particular component, e.g, C445, C32, etc., associated with a particular dashboard can then be associated with the dashboard 404 in the dashboard table 408 of FIG. 4C.

In order to associate the selection of records with a particular dashboard, an active component identifier link can be stored in the comp id link field 407 of the dashboard table. In some embodiments, the link is stored in the dashboard table when a component is created for a particular dashboard. However, the link only become active once the data for the component has been stored, e.g., the report has been generated. In a further embodiment, a blank component, e.g., not having an active link, report or associated records, is not displayed in the dashboard even though that component has been created in the component record table.

In step 305, the records associated with a particular dashboard are analyzed by the criteria entered by the user of the database system who create the dashboard and component. The user can select which type of particular calculation or other aggregation of values is to be performed on the records when creating the component. As previously mentioned, this calculation is stored in the report table 420 shown in FIG. 4E. The records can be analyzed when during the initial creation of the component. In other embodiments, the system does not perform the analysis on the records until the user manually enters, e.g., selects a refresh button, after the creation of the component.

Once the records are analyzed, the numerical values for each component can also be updated in the current value 414 field of the component table 415 in FIG. 4D. In some components, the value includes more than one value, as each value can be individually plotted on the visual representation of the component in the dashboard.

In step 306, when a user views a dashboard in a user interface, the user views on the visual representations, e.g., graphics, of the totaled, aggregate values across a given set of records. The component does not show the detailed information of any of the records relating to the components, e.g. the report defined field values, etc., but a compilation of the user defined criteria based queries, e.g., components, associated with a particular dashboard.

Figure 5:
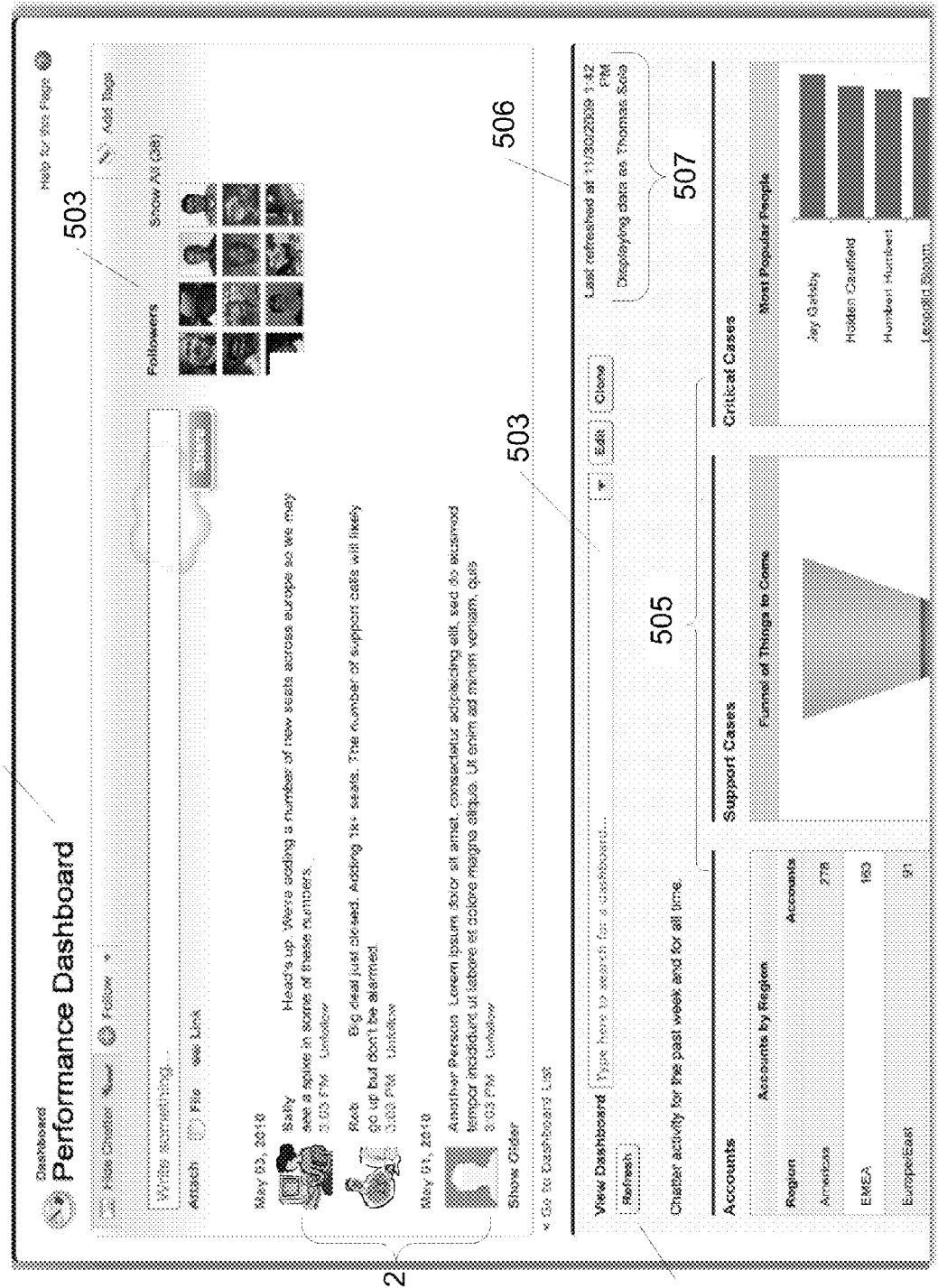
FIG. 5 illustrates an exemplary screenshot of a dashboard in a database system.

Referring now to FIG. 5, an exemplary embodiment of a Chatter® enabled dashboard is provided. The dashboard includes a name or title 501, which is user-defined when the dashboard is created. In some embodiments, the system can provide default names for dashboard based on the components within that dashboard and/or the type of analysis performed on the records associated with the dashboard. In the embodiment shown in FIG. 5, the dashboard is Chatter® enabled and includes an associated feed 502 for the users subscribing, e.g., following 503, the dashboard. In some embodiments, if a user has access rights to view the dashboard, but that user does not have a subscription to the dashboard, the related dashboard feed is not shown. In other embodiments, the feed within a dashboard is visible to any user having visibility of the dashboard.

The user can view any dashboard to which access rights have been given by an administrator of that user's entity. In some embodiments, dashboards created by a user of the database can be provided to other users within that user's team or other group associated with that user. Accordingly, the administrator of the entity can provided access rights to all users in a specific group of users. When a user selects the Dashboard application, e.g., tab, within the user's profile page, a listing of the available dashboards to which that user has access rights can be displayed to the user. In other embodiments, the user can enter a word, phrase or other search criteria in a text box 503 to search available dashboards, such as shown in FIG. 5.

When viewing a dashboard, the feed 502 for the dashboard can be separate from the components 505 within the dashboard. In some embodiments, feeds are available for each component and can be proximate to the visual representation of that component. In other embodiments, the user can arrange the components and feed of the dashboard into a customized configuration.

Each time that the components within a dashboard being viewed are compiled, e.g., updated or refreshed, an indication of the update is also updated and displayed for a user. This enables a user to know whether the current data being displayed within the component is the most recent data. A user can chose to refresh the data at any time by selecting a 'refresh' function provided on the dashboard. Any subscriber to a dashboard can update a dashboard on the system and that update is made visible to all other viewers of the dashboard. Additionally, the dashboard provides an indication of the user who is currently viewing that dashboard. In some embodiments, particular components of a dashboard are not visible to every user, based on the components to which that particular has selectively subscribed. In most embodiments, the user is subscribed to all components within a dashboard by default.

Figure 6:
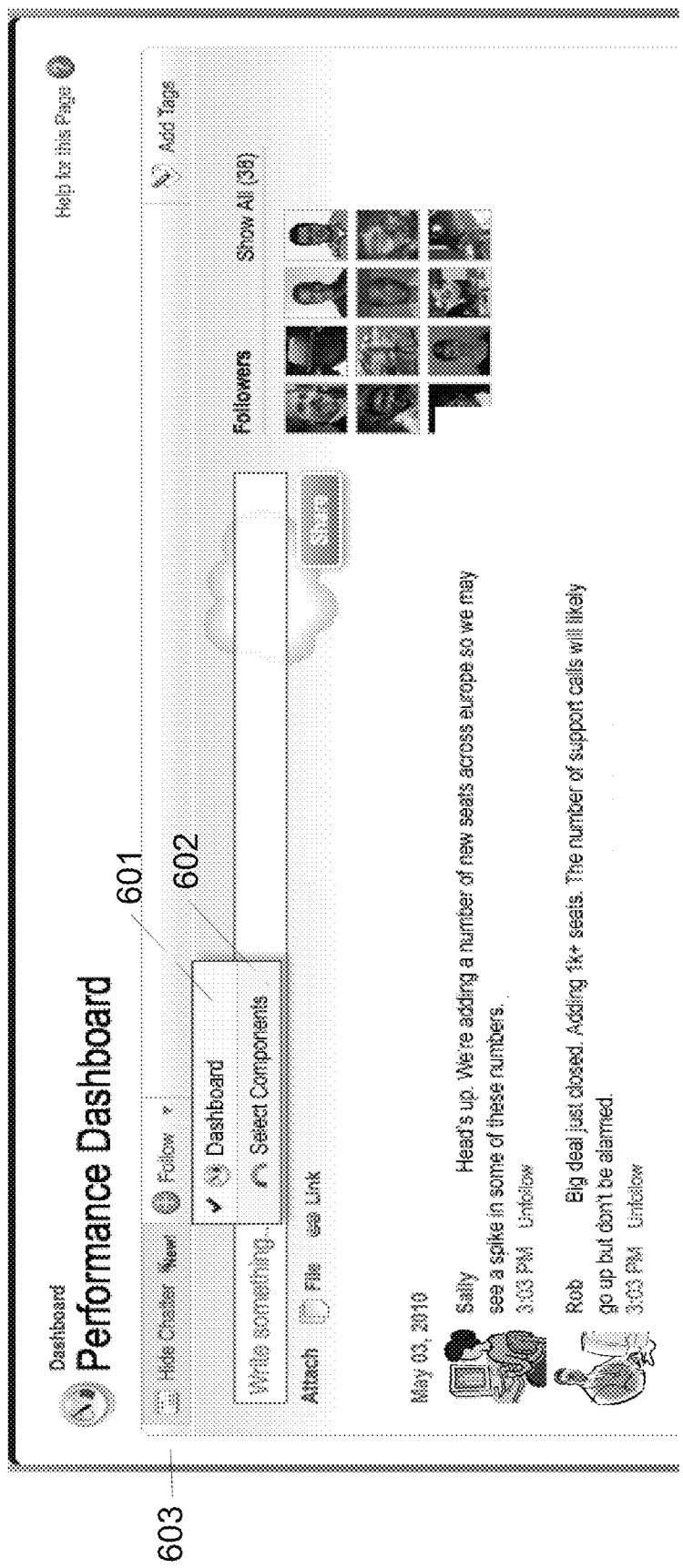
FIG. 6 illustrates an exemplary screenshot for selecting a dashboard or component to follow in a database system.

Referring now to FIG. 6, in an exemplary embodiment, a user viewing a user interface for a particular dashboard 603 is provided with an option to follow a dashboard 601 currently being viewed or follow specific components 602 of that dashboard. In such an embodiment, in order for the component subscription option to appear, the user viewing the dashboard needs to already be following that dashboard. In some embodiments, the user is provided with a 'follow' or 'unfollow' button in the user interface of the dashboard. In further embodiments, a plurality of the aforementioned buttons is provided for the dashboard, such as, for example, proximate to the title of the dashboard and each component within the dashboard. These buttons would only appear near each component if the dashboard is currently being followed by the user viewing the dashboard, e.g., an 'unfollow' button would appear near the title of the dashboard.

Figure 7:
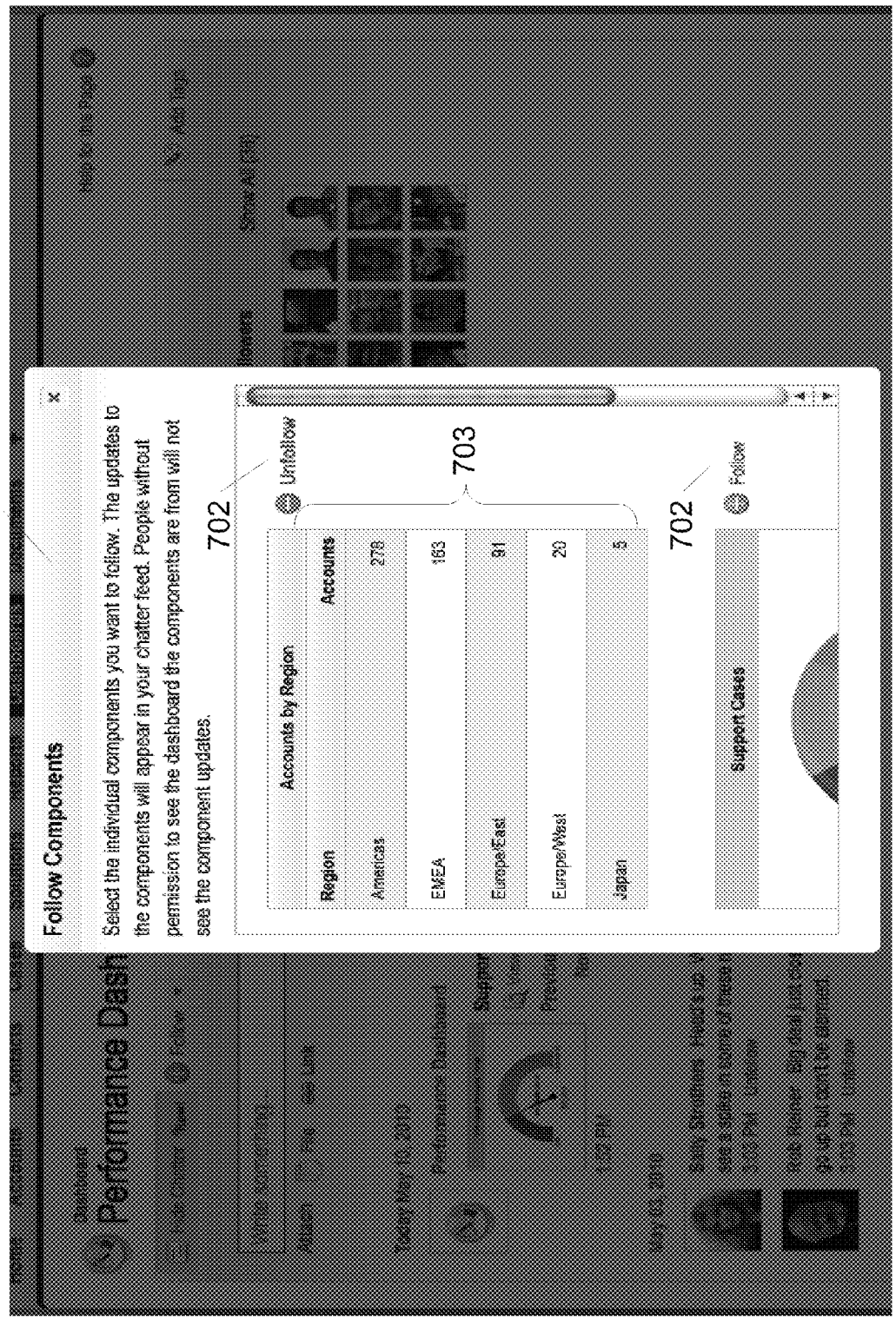
FIG. 7 illustrates an exemplary screenshot of a listing of component in dashboard in a database system.

As shown in FIG. 7, if the user is following the dashboard 603 of FIG. 6 and selects 'components' 602, a window is provided 701 within user interface that supplies the user with a listing of components for that dashboard. In such an embodiment, the user can see a visual representation of each component 703, including the name/titles and current values. In some embodiments, the updates to the components listed are only viewable in the dashboard associated with that component, e.g., after a user has selected to follow that component. For example, the listing of dashboard components provides the user of an instance of that component record, such as from when that component was added to the list of components. The user can select to 'follow' or 'unfollow' each component within the listing. When the user exits the component subscription window 701, the system can update so that the user is capable of viewing each followed component in the current window of the dashboard that user is currently viewing.

In further embodiments, users without permission to view a particular dashboard with which certain components in the listing are associated, are not able to subscribe to that component, e.g., the 'follow' button is not active. In the aforementioned embodiment, a user can be provided with a listing of components from all dashboards within, for example, a tenancy or a work group because a dashboard can be associated with a user and/or a group of users, such as a work group. An administrator in the user's tenancy, e.g., company, defines where a dashboard is stored or provided. Accordingly, a user assigned to a workgroup that creates a dashboard, the records for that dashboard can be stored under that particular work group. In which case, the user would have visibility to dashboard components from other users in the work group. Each of those users can have differing access rights to records on the database system. For example, if one user A in the work group creates a dashboard X containing components associated with records not visible to another user B in the work group, dashboard X and its components are not capable of being followed by user B. In some embodiments, the components and dashboard incapable of being followed by user B are not made visible to user B in a listing of dashboard or the components subscription window 701 in FIG. 7.

As mentioned in previous paragraphs, the dashboard and its components can be updated by a user manually performing a function such as, selecting a 'refresh' button or closing a subscription window. The user, tenancy administrator or a system administrator can also define schedules times, e.g., every 20 minutes, in which the system performs an update on a dashboard. This can aid users viewing that dashboard to see the most current statistics on the records associated with each component as well as provide them with alerts regarding specific components of a dashboard. The alerts can be provided in the user profile feeds of users subscribing to particular dashboard and component. The aforementioned alerts and how they are generated by the system and provided within a feed are described in further detail in the following section.

V. Dashboard Alerts

Methods and systems for providing stories within a feed associated with a component in a dashboard are described in the following section with reference to FIGS. 8-12.

Dashboard alerts provide a user with a message, e.g., a story, in Chatter®, dependent on a set of values defined by a component and when those values have changed, e.g., a set business goals in your company and when those goals have changed. The story is only posted when a goal value has been met, dropped below a certain value or passed any other threshold after a modification to one or more records associated with a dashboard occurs. If prerequisites are validated, such as a component of a dashboard changes relative to goal, a trigger is released causing the system to generate and post a story to a feed of the dashboard with which the component is associated and to a feed of any subscriber to that component.

Figure 8:
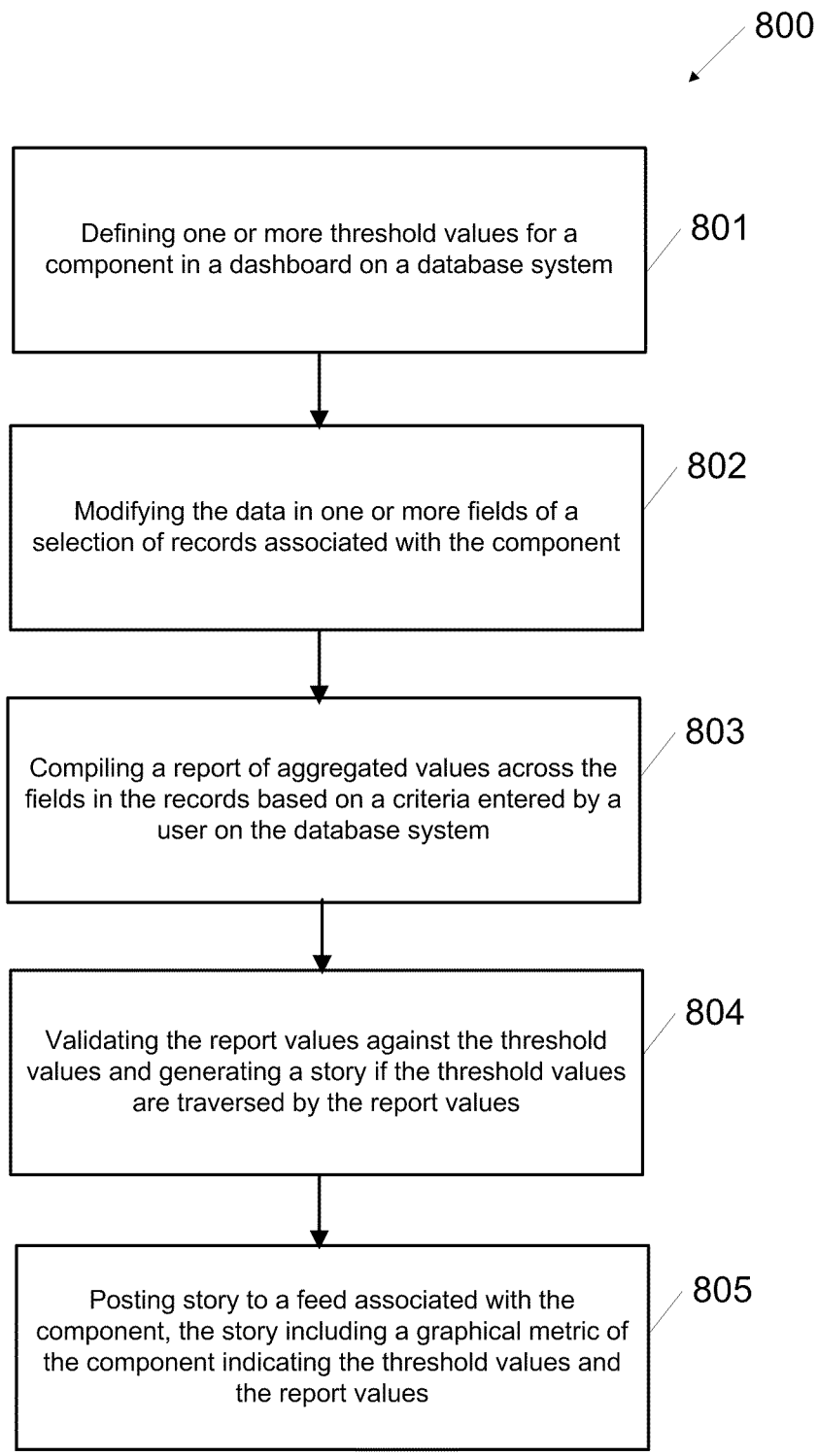
FIG. 8 illustrates a flowchart of a method for generating a story in a feed associated with a component of a dashboard in a database system.

Referring now to FIG. 8, a method 800 is provided for causing a story related to a component in a dashboard to be posted to a feed. The method is described with particular reference to FIGS. 4 and 9-12.

When a user defines the characteristics of a particular component for a dashboard, the user can enter the type of visual representation, e.g., pie chart, bar graph, etc. that the component will have. In some embodiments, the criteria by which the records associated with a component are selected and analyzed, can also determine the type of graph the component will generate. For example, an aggregation of updates in a user profile by day, e.g., a numerical value of a field versus a day in the week, would generate a x versus y bar graph form. In a further example, an summation of sales across a set of records being less than or equal to a threshold value 1, threshold value 2, etc. would generate a different visual metric, such as meter or gauge, which indicates each threshold value and the measured current value of the component. Any type of visual representation can be utilized to display a component, and the system can include predefined graphs provided to the user when the user creates a component, or, the user can create a customized visual representation for a component. Furthermore, the user-defined characteristics for a component can determine the elements of a component. For example, a first threshold value breakpoint is shown.

In step 801, a user defines one or more threshold values by which a component is measured, such as an aggregate value across a plurality of fields within the records associated with that component. The system can provide a drop down menu to a user having example numbers, e.g., 'good' number or 'bad' number or range for which an alert should be generated, or the user can manually enter a value into field. In some embodiments, when a user specifies a threshold, e.g., a breakpoint, for a component, the user can also specify a second indicating visual characteristic which is provided in the component to indicate the breakpoint. The second indicator can include, for example, a color change in the graphic, which is displayed. A third, fourth, fifth, etc. indicator can be defined by the user as well. For example, any number of colors can be utilized to signify different stages in a component at which an alert is to be generated. Both the threshold value and the component characteristics can be defined in the component table object on the database system. Referring back to FIG. 4D, a current value field 414 is provided against which a user-defined threshold value, or values, can be compared. Additionally, the subscriber field 413 can indicate to the database system whether an alert should be generated and/or posted to a feed. If no users are subscribing to a particular component, the system does not need to perform any further functions with the component.

Referring back to FIG. 8, in step 802, a record associated with a component can be modified by a user having access rights to modify that record. The modification of one record, one or more fields, associated with a component does not signify that an alert will be generated for any given component. An alert is only generated when the total aggregate value reaches a certain value.

In step 803, when a system updates, due to a manual user 'refresh' or a scheduled update occurs, the reports are compiled for each component. Referring back to FIG. 4E, the aggregated values are retaken across the selection of records 403 returned from a query based on each record including at least one field 407 that satisfies the user-defined criteria. The user-defined calculation or function 418, to be performed on the selection of records is then implemented and a report value 419 is generated.

Referring again to FIG. 8, in step 804, the report value generated from the user or system entered compilation of a report associated with a component in a dashboard is then validated against a one or more threshold values entered by the user who created the component. In some embodiments, the user has an option to redefine threshold values after they are originally defined for the component. The breakpoints identifying the threshold values on the visual representation of the component in the dashboard will then be updated after the next 'refresh' is performed on the dashboard with which the component is associated. After the report value has been validated against a threshold value, the component object record field 'current value' can be updated to reflect to that report value.

If the value of the component traverses any user-defined threshold value, a story is automatically generated by the system, e.g., an alert is generated. In some embodiments, the alert is only generated if a component has at least one subscriber, e.g., follower. The alerts are only generated for single number components, e.g., a total amount in a pipeline of accounts or an average deal size. Additionally, the validation against a threshold value does not only include a traversal of the value due to an increase in the numerical value of the component. If the threshold value is met or passed, or if a previously met threshold value is not longer maintained, a story is generated. Any traversal of a breakpoint defined on the component causes an alert to occur. As previously mentioned, the user can define multiple breakpoints on the component, each breakpoint representing a threshold value.

Figure 9:
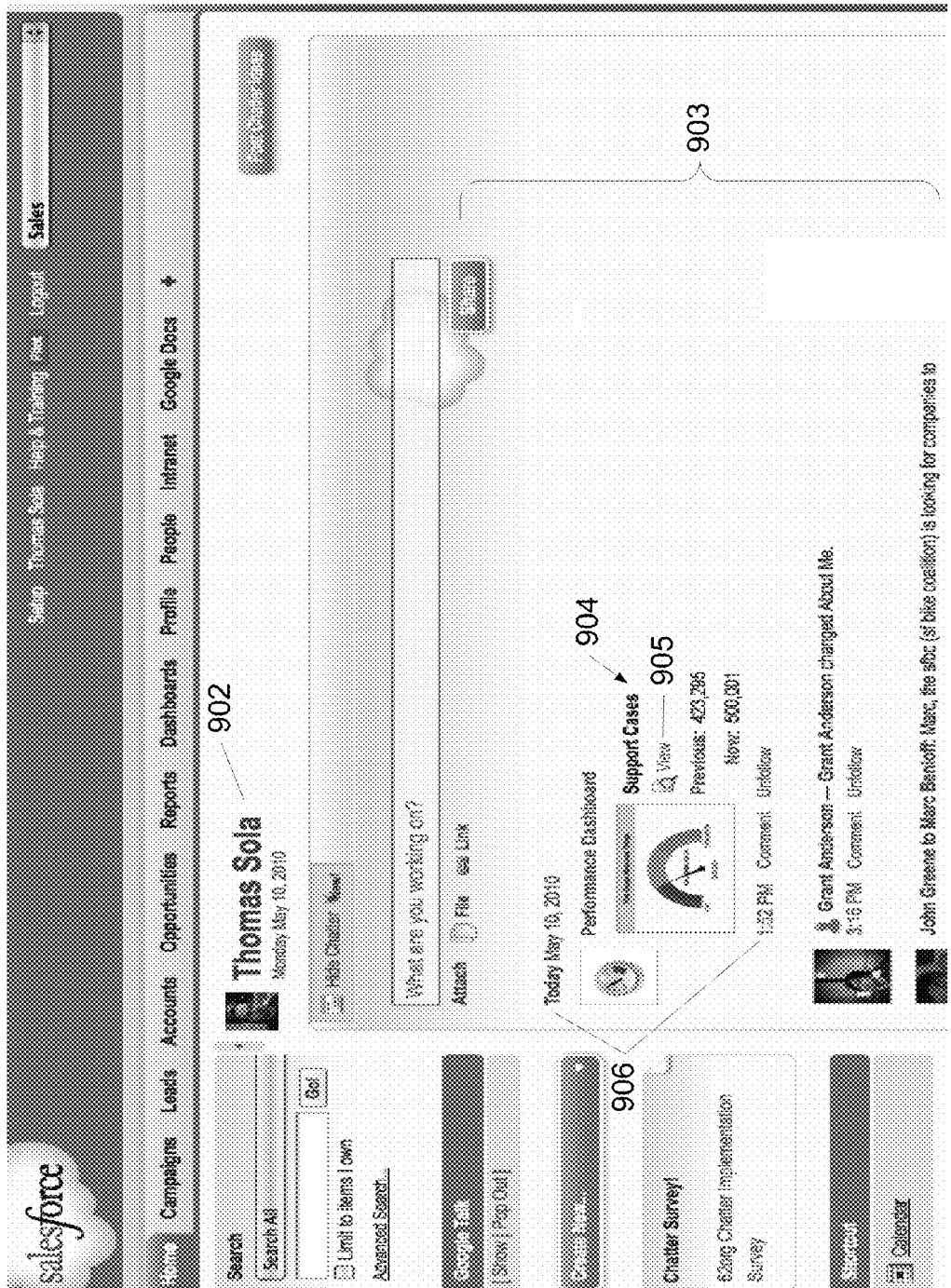
FIG. 9 illustrates an exemplary screenshot of a user profile feed including the story of FIG. 8.

In step 805, the alert is posted to any feed associated with the component. The feed can include a user profile feed and a feed of the dashboard in which the component is associated. As shown in FIG. 9, a meter, or gauge, component alert 906 is posted to a feed 903 of a user 902 on that user's profile 901, e.g., 'home' page. The alert 906 includes a scaled down version of the component graphic as it appears in the dashboard. The alert also includes the name of the component 904 and 'view' option 905, which allows the user to view an enlarged view of the alert in the feed.

Figure 10:
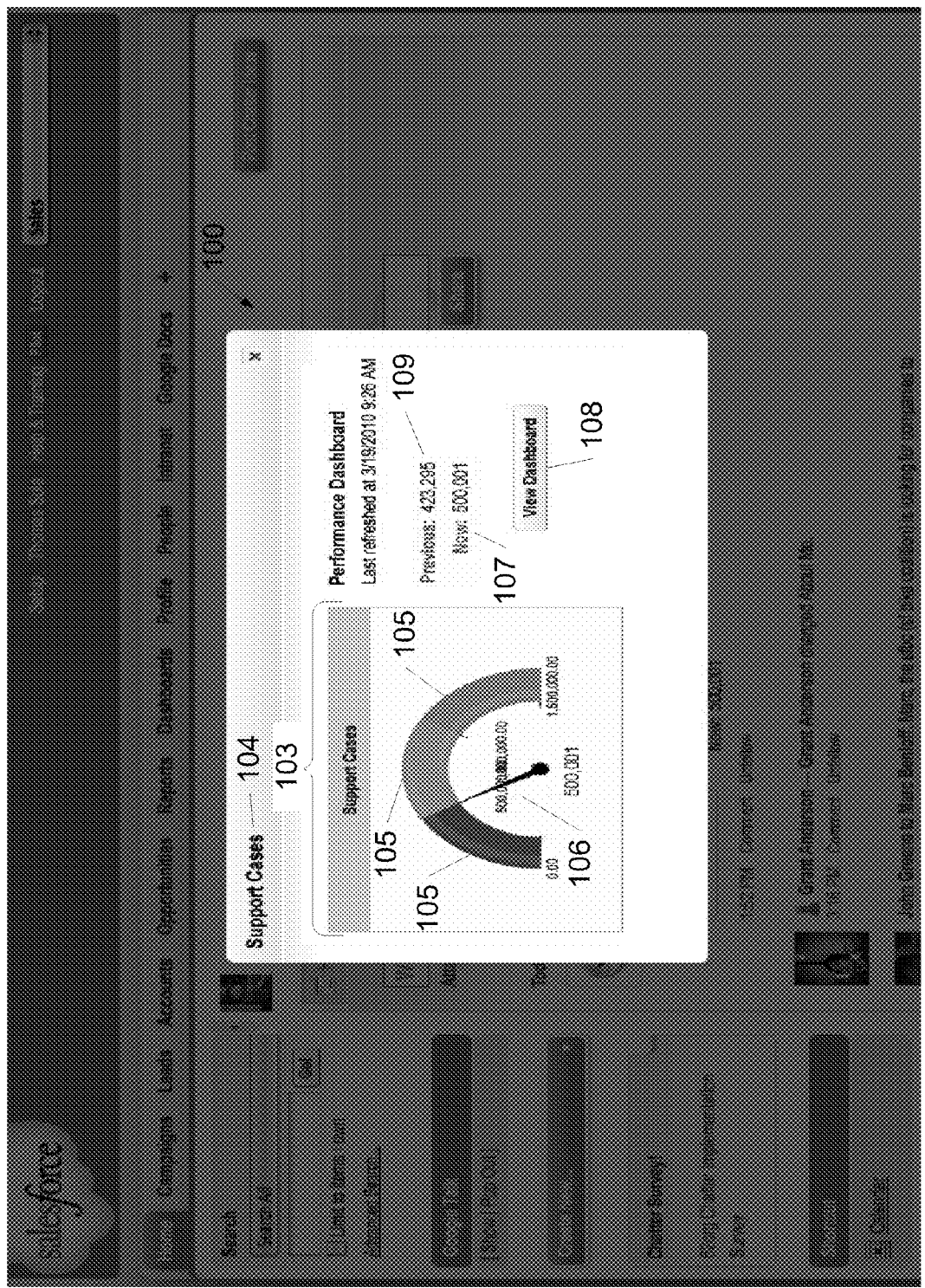
FIG. 10 illustrates an exemplary screenshot of an expanded view of the story in FIG. 9.

If the user selects to view 905 the alert, a window including a larger version of the alert is presented in the user interface as shown in FIG. 10. In some embodiments, the current user profile page in which the alert is called for viewing dims so that the user can more easily view the alert. The larger version of the alert includes the component name or title 104 and the visual representation 103, e.g., graph, gauge, chart, etc., of the component. The alert also provides each indication of a breakpoint, having stages prior to any after each breakpoint. These stages 105 can be color or otherwise defined by the user or system during creation of the component. The alert also shows the current value 106 of the component on the gauge 103. The aforementioned current value 107 is additionally provided within the alert window in numerical format along with the previous value 109 of the component. Accordingly, the user can easily understand why the alert was provided in his/her feed through comparison of the previous and current value.

In some embodiments, the component object table (FIG. 4D) or the report table (FIG. 4E) can include two value fields of a 'previous value' and a 'current value' each of which can be referenced by the component. Referring again to FIG. 10, the user has also has an option to view the dashboard 108 with which that component is associated. Such an option may be helpful to a user, e.g., if that dashboard includes other components associated with records in the alert that do not produce alerts.

Figure 11:
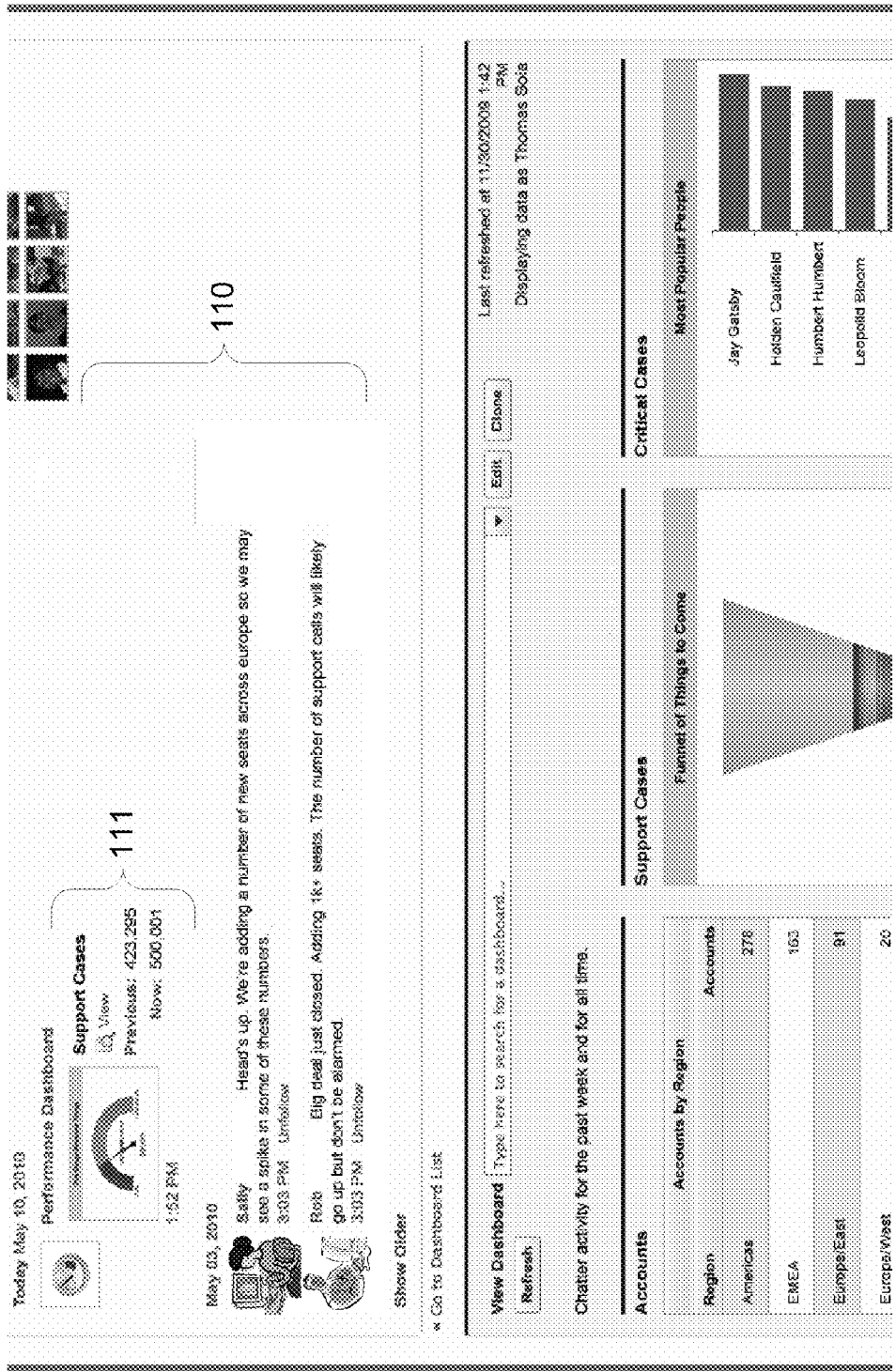
FIG. 11 illustrates an exemplary screenshot of a dashboard feed including the story of FIG. 8.

As shown in FIG. 11, when the user views the dashboard in which the component is associated, the same alert 111 also appears in a feed 110 associated with that dashboard. The alert provides the same information and functionality in the dashboard feed as within the user profile feed. Additionally, similar to most posts, comments and stories within a feed, the time and date that the alert was generated, e.g., the time and date the report was compiled and the threshold values were traversed is stamped on the posting of the alert for reference to the user.

Figure 12:
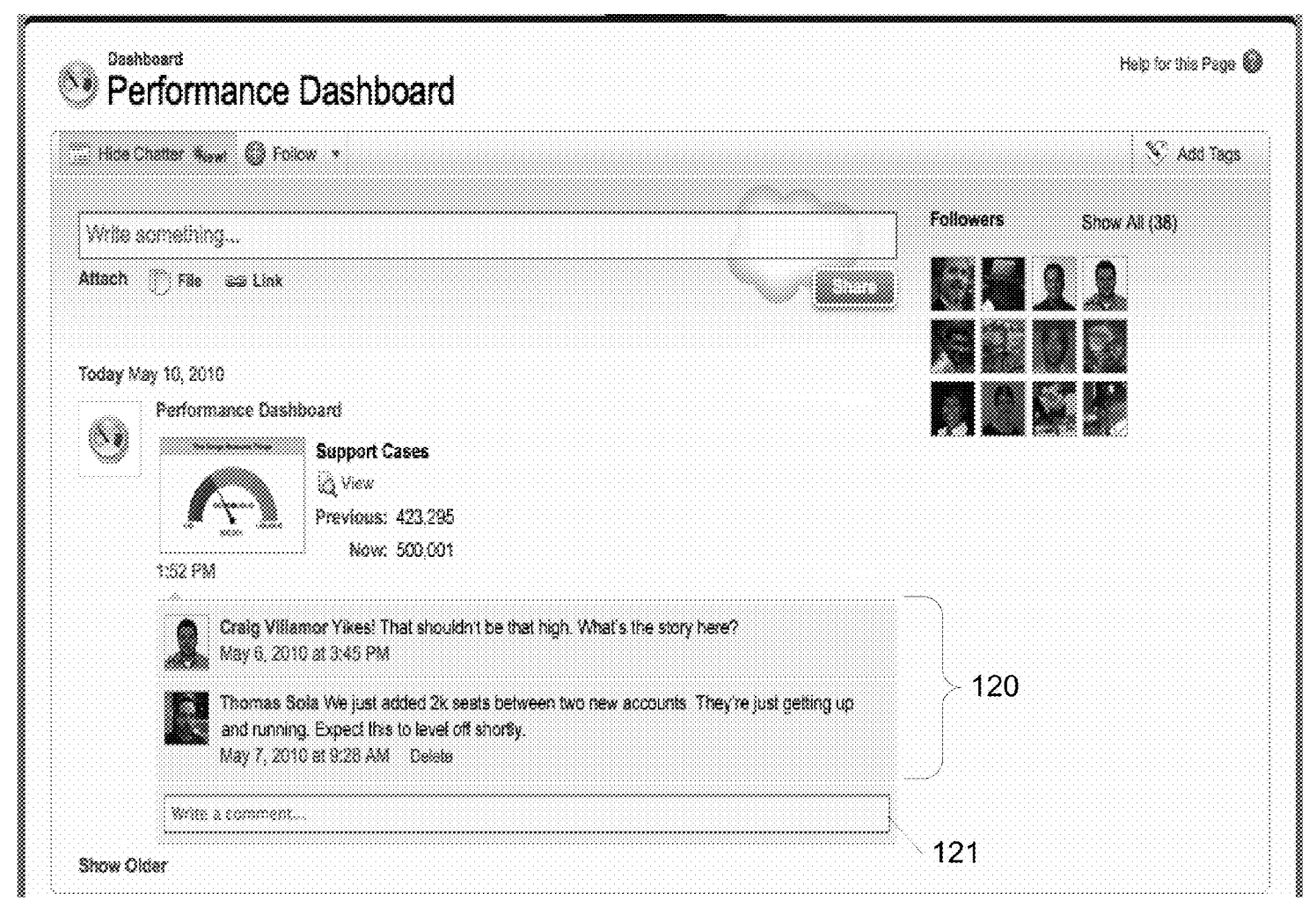

Referring now to FIG. 12, a larger view of the dashboard feed in FIG. 11 is provided. The feed includes the component alert and other feed items, e.g., comments 120. Similar to posts and other stories in a feed, a user is capable of commenting on the alert in a feed. Accordingly, a comment field 121 is provided to the user under each alert. In some embodiments, if the alert has no existing comments, the user can select to 'comment' on the alert and the comment field 121 will appear. As previously discussed, only comments made by the user viewing the dashboard can be deleted by that user. In some embodiments, an alert can be removed, e.g., deleted, from a user profile feed by that user, but cannot be deleted from a dashboard feed. In other embodiments, the user who created the dashboard can delete the alert from the feed of that dashboard.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for providing a story in a feed associated with a component on a database system, the method comprising:
   compiling a report of aggregate numerical values based on an analysis of one or more fields in a selection of records stored on the database system to define a dashboard providing analytical indicators of the aggregate numerical values, the dashboard including one or more components, each component having a graphical representation in a user interface on a display device, the graphically represented component being a visual metric representing one or more of the numerical values;
   validating one or more threshold values for the component against the report;
   generating the story when the one or more threshold values are traversed by the report values, the story being a description of an event occurring to the selection of records; and
   posting the story including an identification of the component in one or more feeds associated with the component;

wherein a user interface presented on a display device of a user subscribed to the component displays the graphical representation of the component, the one or more feeds including the story, and one or more selections to receive user commentary to be posted to the one or more feeds in response to the story, such that the displayed one or more feeds includes a plurality of comments from a plurality of users regarding the story, and one or more of the comments are in response to a preceding comment regarding the story.

2. The method of claim 1, wherein the one or more feeds associated with the component includes a feed of a subscriber to the component.

3. The method of claim 1, wherein a user of the database system provides an indication of the one or more threshold values.

4. The method of claim 1, wherein the story is generated from an update requested by a subscriber to the component.

5. The method of claim 1, wherein the story is generated automatically when the system performs a scheduled update.

6. The method of claim 1, wherein the story includes the component.

7. The method of claim 1, wherein the component is associated with a collection of components.

8. The method of claim 1, wherein the visual metric is a graphical configuration.

9. The method of claim 1, wherein the one or more feeds associated with the component include a dashboard feed and user profile feeds of users subscribed to the component.

10. One or more computing devices for providing a story in a feed associated with a component on a database system, the one or more computing devices comprising:
   one or more processors executing one or more instructions to:
      compile a report of aggregate numerical values from one or more fields in a selection of records stored on the database system to define a dashboard providing analytical indicators of the aggregate numerical values, the dashboard including one or more components, each component having a graphical representation in a user interface on a display device, the graphically represented component being a visual metric representing one or more of the numerical values,
      validate one or more threshold values for the component against the report,
      generate the story when the one or more threshold values are traversed by the report values, the story being a description of an event occurring to the selection of records, and
      post the story including an identification of the component in the one or more feeds associated with the component;
   wherein a user interface presented on a display device of a user subscribed to the component displays the graphical representation of the component, the one or more feeds including the story, and one or more selections to receive user commentary to be posted to the one or more feeds in response to the story, such that the displayed one or more feeds includes a plurality of comments from a plurality of users regarding the story, and one or more of the comments are in response to a preceding comment regarding the story.

11. A non-transitory computer program product comprising a machine-readable medium storing a plurality of instructions for controlling a processor to perform a method for providing a story in a feed associated with a component on a database system, the method comprising:
   compiling a report of aggregate numerical values based on an analysis of one or more fields in a selection of records stored on the database system to define a dashboard providing analytical indicators of the aggregate numerical values, the dashboard including one or more components, each component having a graphical representation in a user interface on a display device, the graphically represented component being a visual metric representing one or more of the numerical values;
   validating one or more threshold values for the component against the report;
   generating the story when the one or more threshold values are traversed by the report values, the story being a description of an event occurring to the selection of records; and
   posting the story including an identification of the component in the one or more feeds associated with the component;
   wherein a user interface presented on a display device of a user subscribed to the component displays the graphical representation of the component, the one or more feeds including the story, and one or more selections to receive user commentary to be posted to the one or more feeds in response to the story, such that the displayed one or more feeds includes a plurality of comments from a plurality of users regarding the story, and one or more of the comments are in response to a preceding comment regarding the story.

* * * * *